US012676915B2

(12) United States Patent (10) Patent No.: US 12,676,915 B2
Ogino (45) Date of Patent: Jul. 7, 2026

(54) SERVICE PROVIDING DEVICE, SERVICE PROVIDING SYSTEM, AND COMPUTER-READABLE RECORDING MEDIUM

(71) Applicant: Fanuc Corporation, Minamitsuru-gun (JP)

(72) Inventor: Hideo Ogino, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 31 days.

(21) Appl. No.: 18/709,884

(22) PCT Filed: Nov. 29, 2021

(86) PCT No.: PCT/JP2021/043661
§ 371 (c)(1),
(2) Date: May 14, 2024

(87) PCT Pub. No.: WO2023/095343
PCT Pub. Date: Jun. 1, 2023

(65) Prior Publication Data
US 2025/0023955 A1 Jan. 16, 2025

(51) Int. Cl.
*H04L 67/51* (2022.01)
*H04L 67/12* (2022.01)
(52) U.S. Cl.
CPC .............. *H04L 67/51* (2022.05); *H04L 67/12* (2013.01)
(58) Field of Classification Search
CPC ....... H04L 67/12; H04L 67/125; H04L 67/51; H04L 63/102
See application file for complete search history.

(56) References Cited

U.S. PATENT DOCUMENTS 10,038,808 B1 * 7/2018 Bhaskaran ......... H04N 1/00973
2002/0080931 A1 6/2002 Yamamoto et al.
(Continued)

FOREIGN PATENT DOCUMENTS

JP H07234714 A 9/1995
JP 2002111894 A 4/2002
(Continued)

OTHER PUBLICATIONS

International Search Report (PCT/ISA/210) with translation and Written Opinion (PCT/ISA/237) mailed Feb. 15, 2022, by the Japan Patent Office as the International Searching Authority for International Application No. PCT/JP2021/043661. (8 pages).

*Primary Examiner* — Tonia L Dollinger
*Assistant Examiner* — Linh T. Nguyen
(74) *Attorney, Agent, or Firm* — BUCHANAN INGERSOLL & ROONEY PC

(57) ABSTRACT

A service providing device includes: a request reception unit that receives request information including machine-specific information that uniquely identifies an industrial machine, requested service information that specifies a desired service to use with the industrial machine, and request condition information that includes conditions for using the service; a determination unit that determines whether the service requested by the request information can be provided and the conditions under which the service can be provided, the determination being based on the request information and service information that associates information related to the provision of a service of the industrial machine with the machine-specific information; and a service information providing unit that provides a result of the determination by the determination unit to the industrial machine.

9 Claims, 12 Drawing Sheets

(56)            References Cited

U.S. PATENT DOCUMENTS

| | | | |
|---|---|---|---|
| 2007/0208837 A1* | 9/2007 | Tian | G06F 3/1232 |
| | | | 709/223 |
| 2015/0271749 A1* | 9/2015 | Lu | H04W 48/18 |
| | | | 455/437 |
| 2016/0352841 A1* | 12/2016 | Dowlatkhah | H04L 67/306 |
| 2018/0060799 A1* | 3/2018 | Heyer | G06Q 10/20 |
| 2018/0263070 A1* | 9/2018 | Pang | H04L 67/34 |
| 2019/0208024 A1* | 7/2019 | Jablonski | G06Q 20/308 |
| 2019/0272569 A1 | 9/2019 | Kanamoto | |
| 2019/0319843 A1* | 10/2019 | Telfer | H04L 41/0806 |
| 2019/0349426 A1* | 11/2019 | Smith | H04L 63/123 |
| 2019/0356747 A1* | 11/2019 | Wu | H04W 4/02 |
| 2020/0329489 A1* | 10/2020 | Li | H04L 1/0009 |
| 2020/0358673 A1* | 11/2020 | Ren | H04W 4/029 |
| 2021/0347002 A1* | 11/2021 | Gallo | B23Q 11/0085 |
| 2022/0198392 A1* | 6/2022 | Locher | G06Q 10/101 |

FOREIGN PATENT DOCUMENTS

| | | | |
|---|---|---|---|
| JP | 2008134969 A | 6/2008 | |
| JP | 2018081399 A | 5/2018 | |

* cited by examiner

FIG.3

| | EXAMPLES OF REQUEST INFORMATION |
|---|---|
| 1 | REQUEST TO EXTEND SERVICE S666 FOR MACHINE ID: 01-0001-01 BY 30 DAYS |
| 2 | REQUEST TO EXTEND SERVICE S677 FOR MACHINE ID: 01-0001-01 BY 30 DAYS |
| 3 | REQUEST TO ADD 100 TIMES TO SERVICE R696 FOR MACHINE ID: 01-0001-01 |
| 4 | REQUEST TO ADD 100 TIMES TO SERVICE J834 FOR MACHINE ID: 01-0001-01 |

FIG.4

MACHINE ID: 01-0001-01 (MTB NUMBER-MACHINE USER NUMBER-SERIAL NUMBER)

| SERVICE NUMBER | AVAILABLE SERVICE | FORM OF PROVISION | STATE OF PROVISION | PERIOD OF PROVISION | REMAINING PERIOD OF PROVISION | ⋮ |
|---|---|---|---|---|---|---|
| S666 | THREE-DIMENSIONAL ERROR CORRECTION | USE PERIOD | PURCHASE | PERMANENT | — | ⋮ |
| S677 | TOOL CENTER POINT CONTROL | USE PERIOD | PROVIDED | 365 DAYS | 10 DAYS | ⋮ |
| R696 | SMOOTH TOLERANCE CONTROL | USE PERIOD OR NUMBER OF USES | NOT YET PROVIDED | — | 0 DAYS | ⋮ |
| J834 | BALANCE CUT | UNAVAILABLE | — | — | — | ⋮ |
| ⋮ | ⋮ | ⋮ | ⋮ | ⋮ | ⋮ | |

FIG.5

| | EXAMPLES OF DETERMINATION RESULT (OUTPUTTED SERVICE INFORMATION) |
|---|---|
| 1 | ALREADY PURCHASED, UNACCEPTED REQUEST TO EXTEND SERVICE PERIOD (PERMANTLY AVAILABLE) |
| 2 | ALREADY PROVIDED, SERVICE PERIOD EXTENDED BY 30 DAYS (40 DAYS TO USE) |
| 3 | START PROVISION, 100 USES (100 TIMES TO USE) |
| 4 | UNAVAILABLE |

FIG.6

MACHINE ID: 01-0001-01 (MTB NUMBER-MACHINE USER NUMBER-SERIAL NUMBER)

| SERVICE NUMBER | AVAILABLE SERVICE | FORM OF PROVISION | STATE OF PROVISION | PERIOD OF PROVISION | REMAINING PERIOD OF PROVISION | UNIT PRICE | | TOTAL AMOUNT | ADDITIONAL AMOUNT |
|---|---|---|---|---|---|---|---|---|---|
| | | | | | | DAILY | YEARLY | | |
| S677 | TOOL CENTER POINT CONTROL | USE PERIOD | PROVIDED | 365 DAYS | 10 DAYS | JPY100 | JPY30,000 | JPY30,000 | — |
| ⋮ | ⋮ | ⋮ | ⋮ | ⋮ | ⋮ | ⋮ | ⋮ | ⋮ | ⋮ |

FIG.7

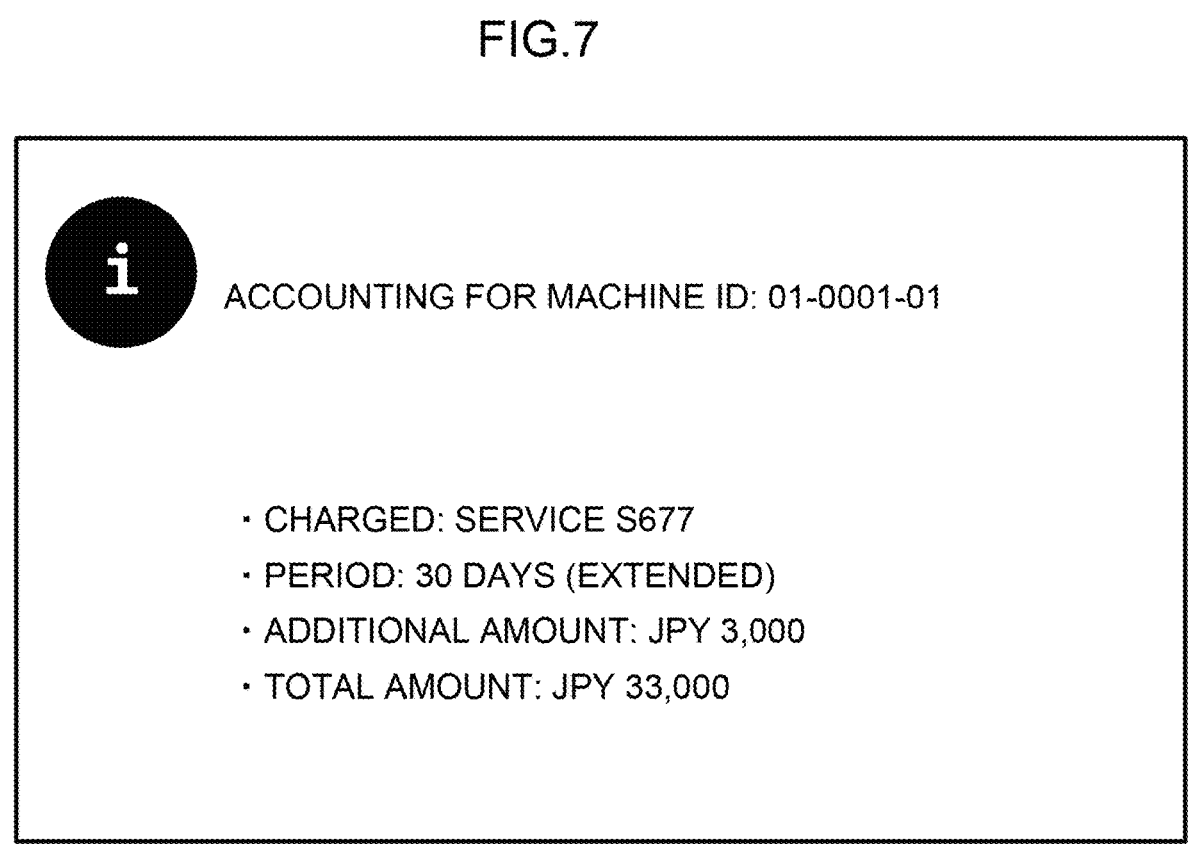

ACCOUNTING FOR MACHINE ID: 01-0001-01

· CHARGED: SERVICE S677

· PERIOD: 30 DAYS (EXTENDED)

· ADDITIONAL AMOUNT: JPY 3,000

· TOTAL AMOUNT: JPY 33,000

FIG.8

MACHINE ID: 01-0001-01 (MTB NUMBER-MACHINE USER NUMBER-SERIAL NUMBER)

| SERVICE NUMBER | AVAILABLE SERVICE | STATE OF PROVISION | NUMBER OF TIMES OF PROVISION | REMAINING NUMBER OF TIMES OF PROVISION | UNIT PRICE | | TOTAL AMOUNT | ADDITIONAL AMOUNT |
| --- | --- | --- | --- | --- | --- | --- | --- | --- |
| | | | | | EACH USE | 200 USES | | |
| R696 | SMOOTH TOLERANCE CONTROL | NOT YET PROVIDED | — | 0 TIMES | JPY200 | JPY35,000 | — | — |
| ... | ... | ... | ... | ... | ... | ... | ... | ... |

FIG.9

MACHINE ID: 01-0001-01 (MTB NUMBER-MACHINE USER NUMBER-SERIAL NUMBER)

| SERVICE NUMBER | AVAILABLE SERVICE | FORM OF PROVISION | STATE OF PROVISION | PERIOD OF PROVISION | REMAINING SERVICE PERIOD | WARNING THRESHOLD VALUE | ... |
|---|---|---|---|---|---|---|---|
| S677 | TOOL CENTER POINT CONTROL | USE PERIOD | PROVIDED | 395 DAYS | 3 DAYS | 3 DAYS | ... |
| ... | ... | ... | ... | ... | ... | ... | ... |

PROHIBITED SERVICE REQUESTED FROM
MACHINE ID: 01-0001-01

· PROHIBITED: SERVICE S677

SERVICE PROVIDING DEVICE, SERVICE PROVIDING SYSTEM, AND COMPUTER-READABLE RECORDING MEDIUM

CROSS REFERENCE TO RELATED APPLICATIONS

This is the U.S. National Phase application of PCT/JP2021/043661, filed Nov. 29, 2021, the disclosure of these applications being incorporated herein by reference in their entireties for all purposes.

FIELD OF THE INVENTION

The present invention relates to a service providing device, a service providing system, and a computer-readable recording medium.

BACKGROUND OF THE INVENTION

A variety of service (functions) is provided and actualized by industrial machines and the service providing devices thereof. Generally, users purchase necessary service. Purchased service is set to be valid upon or after the shipment of industrial machines. Thereafter, the service is permanently accessible (for example, PTL 1).

PATENT LITERATURE

[PTL 1] Japanese Patent Application Publication No. H7-234714

SUMMARY OF THE INVENTION

Some functions for machining in industrial machines are particularly expensive. For functions used in high-volume production of products, high cost is negligible. However, expensive functions are difficult to purchase if the functions are to be used after trial machining or are scheduled to be used for low-volume high-variety production. This is because the functions are purchased without identifying the frequency of use after trial machining or the duration of continuous use. Minimum required service cannot be effectively used when necessary.

Expensive functions may cause economic burdens on the users of industrial machines depending upon the manner in which the functions are used. Moreover, the expensive functions may increase the manufacturing cost, leaving no alternative but to pass the cost increase on to product prices.

Thus, a required technique is to effectively use minimum required service when necessary.

An aspect of the present disclosure is a service providing device for an industrial machine, the service providing device being for providing service available at the industrial machine under predetermined conditions, the service providing device including: a request acceptor for accepting request information including at least machine-specific information for uniquely identifying the industrial machine, request service information for specifying service to be used at the industrial machine, and request condition information including use conditions of the service; a determinator for determining availability of service requested by the request information and provision conditions, based on the request information and service information that at least information on provision of service of the industrial machine is associated with the machine-specific information; and a service information provider for providing a result of determination by the determinator to the industrial machine.

Another aspect of the present disclosure is a service providing system for an industrial machine, the service providing system being for providing service available at the industrial machine under predetermined conditions based on a request, wherein the service providing device manages at least one industrial machine for performing the service, and the industrial machine is configured to: output the request information to the service providing device, and provide the service based on the result of determination of the service information by the determinator in response to the request information.

Another aspect of the present disclosure is a computer-readable recording medium in which a program for operating a computer as a service providing device for an industrial machine is recorded, the service providing device being for providing service available at the industrial machine under predetermined conditions, the program causing the computer to operate as: a request acceptor for accepting request information including at least machine-specific information for uniquely identifying the industrial machine, request service information for specifying service to be used at the industrial machine, and request condition information including use conditions of the service; a determinator for determining availability of service requested by the request information and provision conditions based on the request information and service information that at least information on provision of service of the industrial machine is associated with the machine-specific information; and a service information provider for providing a result of determination by the determinator to the industrial machine.

Advantageous Effect of Invention

According to an aspect of the present disclosure, among services available at individual industrial machines, minimum required service can be effectively used by a machine user when necessary.

BRIEF DESCRIPTION OF DRAWINGS

FIG. 3 shows some examples of request information.

FIG. 4 shows some examples of service information.

FIG. 5 shows some examples of the result of determination in response to a request.

FIG. 6 shows an example of the service information including accounting information based on a use period.

FIG. 7 shows a display example of a result of determination including accounting information in response to a request.

FIG. 8 shows an example of the service information including accounting information based on the number of uses.

FIG. 9 shows an example of service information including a warning threshold value.

FIG. 10 is a block diagram illustrating schematic functions of a service providing device according to a second embodiment.

FIG. 11 shows a display example of a result of use determination.

DETAILED DESCRIPTION OF EMBODIMENTS OF THE INVENTION

Hereinafter, embodiments of the present invention will be described in accordance with the accompanying drawings.

Figure 1:
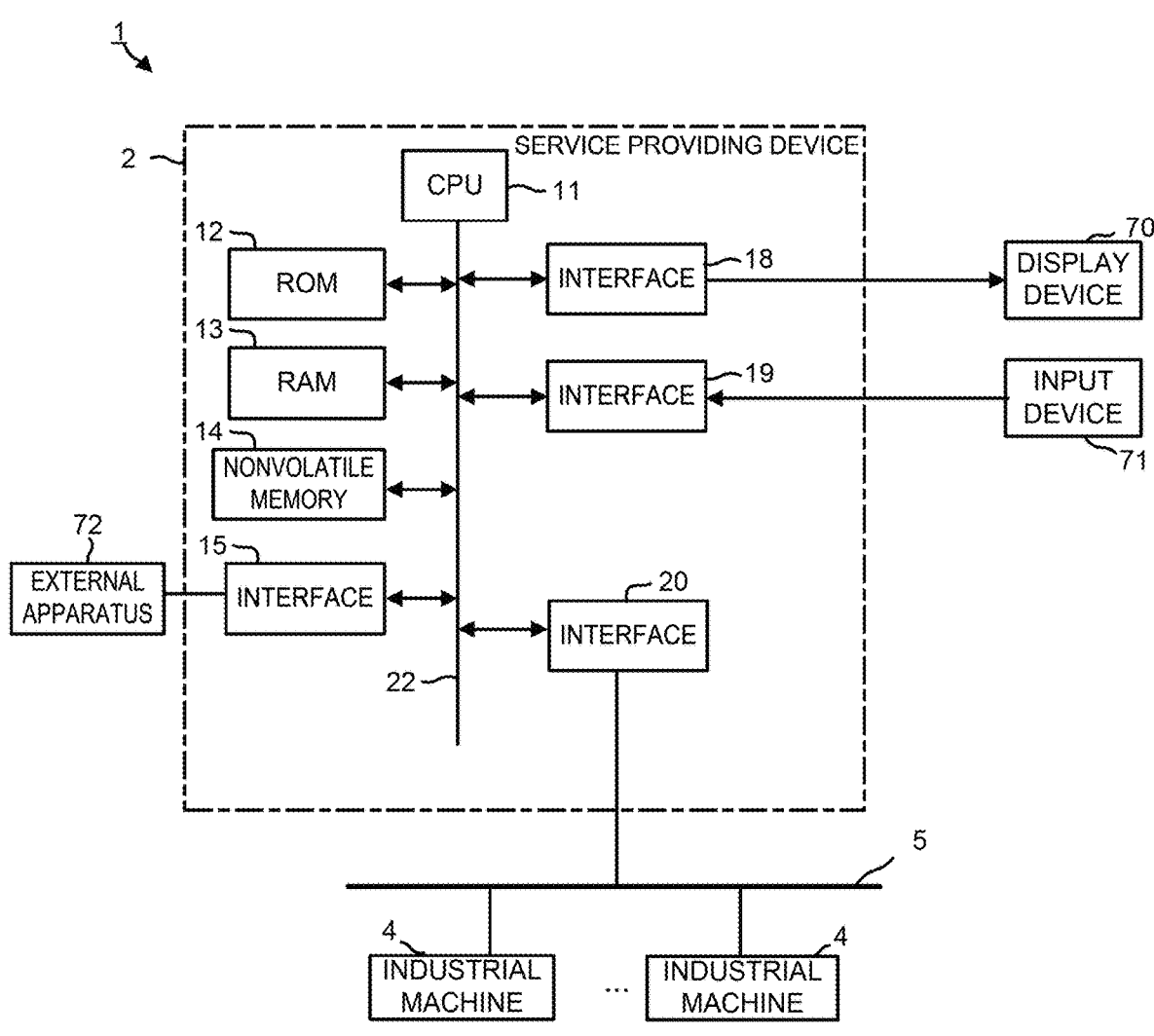
FIG. 1 is a schematic hardware configuration diagram schematically illustrating a service providing device according to an embodiment of the present invention.

FIG. 1 is a schematic hardware configuration diagram illustrating the principal part of a service providing device according to an embodiment of the present invention. A service providing device 2 of the present invention is connected to industrial machines 4 installed in a factory, via a network 5, such as the Internet. The service providing device 2 manages the industrial machines 4 so as to constitute a service providing system 1. The service providing device 2 can be mounted on computers such as a server. In the industrial machines 4 in the present embodiment, software for available service is preinstalled. Moreover, the industrial machine 4 is configured to use a corresponding function when receiving information on predetermined permission to use the function from the service providing device 2.

A CPU 11 provided for the service providing device 2 of the present invention is a processor for controlling the overall service providing device 2. The CPU 11 reads, via a bus 22, a system program stored in a ROM 12 to control the overall service providing device 2 according to the system program. In a RAM 13, temporary computational data, display data, and various kinds of data inputted from the outside are temporarily stored.

A nonvolatile memory 14 includes, for example, memory and an SSD (Solid State Drive) which are backed up by a battery, not shown, and keeps a storage state even when the service providing device 2 is powered off. Stored in the nonvolatile memory 14 includes data and processing programs which are read from an external apparatus 72 via an interface 15, data and programs which are inputted through an input device 71, and data transmitted from the industrial machines 4. The data and the processing program that are stored in the nonvolatile memory 14 may be expanded in the RAM 13 when being executed/used. In the ROM 12, various system programs such as known analyzers are written in advance.

The interface 15 is an interface for connecting the CPU 11 in the service providing device 2 to the external apparatus 72, e.g., a USB device. From the external apparatus 72, for example, a program for the function of the service providing device 2 and various kinds of data about the provision of service can be read. Furthermore, programs and various kinds of data that are edited in the service providing device 2 can be stored in external storage means through the external apparatus 72.

On a display device 70, for example, various data read on the memory and data obtained as a result of the execution of a processing program and a system program are outputted and displayed via an interface 18. The input device 71 including a keyboard and a pointing device delivers a command based on an operation by an operator, data, and so on via an interface 19 to the CPU 11.

The interface 20 is an interface for connecting the CPU 11 in the service providing device 2 to the network 5. The network 5 may be a WAN (Wide Area Network) including a private line or a wide-area network such as the Internet. The industrial machines 4 such as a machine tool and a robot, which are installed in a factory or the like, and a fog computer and a cloud server, which are not shown, are connected to the network 5. These devices exchange data with the service providing device 2 via the network 5.

Figure 2:
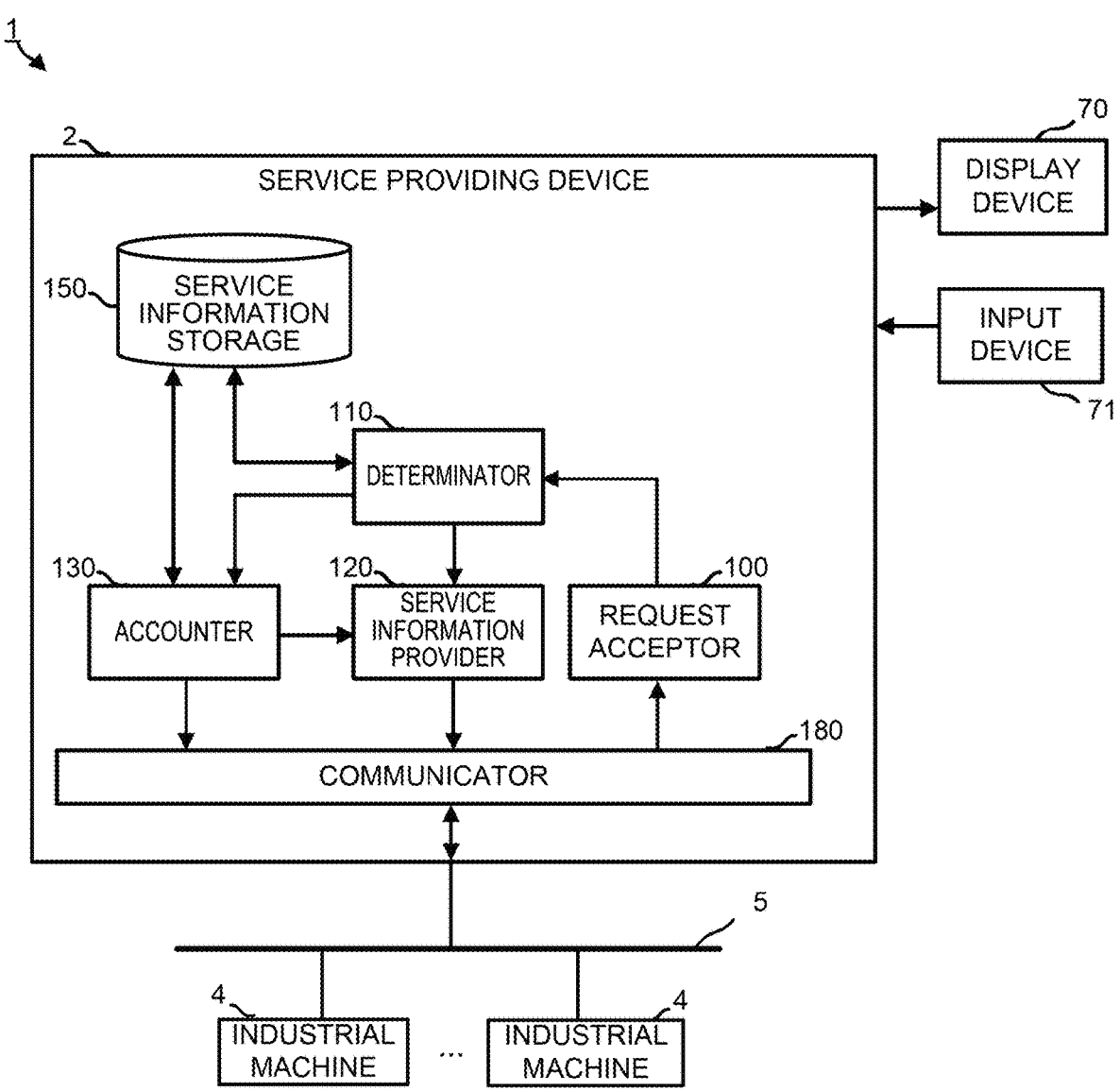
FIG. 2 is a block diagram illustrating the schematic functions of a service providing device according to a first embodiment of the present invention.

FIG. 2 is a schematic block diagram illustrating the functions of the service providing device 2 according to the first embodiment of the present invention. The functions of the service providing device 2 according to the present embodiment are actualized by executing the system program by the CPU 11 provided for the service providing device 2 illustrated in FIG. 1 and controlling the operations of the respective units of the service providing device 2.

The service providing device 2 of the embodiment includes a request acceptor 100, a determinator 110, a service information provider 120, an accounter 130, and a communicator 180. Moreover, in the RAM 13 and the nonvolatile memory 14 in the service providing device 2, a service information storage 150 is prepared as a storage area of service information that is information on service provided for the industrial machines 4.

The request acceptor 100 accepts request information on service used at the industrial machines 4. The request information includes machine-specific information that can uniquely identify at least the industrial machines 4 managed by the service providing device 2, request service information that can uniquely identify requested service, and request condition information indicating request conditions of the service. The machine-specific information may have any structure if the information can uniquely identify at least the managed industrial machines. For example, the machine-specific information may include information for uniquely identifying a machine tool builder (e.g., a Machine Tool Builder number), information for uniquely identifying users of the industrial machines 4 (e.g., a machine user number), and information for uniquely identifying the industrial machines 4 possessed by the users. The request service information may have any structure if the information can uniquely identify at least the service (functions) of the industrial machines 4 managed by the service providing device 2. For example, the information may include the name of a requested function or a properly allocated function number. The request condition information may include any conditions for the use of service, for example, a condition for a use period, a condition for an expiration date, a condition for the number of uses, and conditions for other restrictions on use (for example, a geographical position for use, a time period for use, and the use of some functions). The request acceptor 100 outputs the accepted request information to the determinator 110.

FIG. 3 shows examples of the request information. The first request information includes information of a machine ID: 01-0001-01 as machine-specific information, a function number: S666 as request service information, and 30 days indicating an additional use period as request condition information. The second request information includes information about a machine ID: 01-0001-01 as machine-specific information, a function number: S677 as request service information, and 30 days indicating an additional use period as request condition information. The third request information includes information about a machine ID: 01-0001-01 as machine-specific information, a function number: R696 as request service information, and one hundred times indicating the number of additional uses as request condition information. The fourth request information includes information about a machine ID: 01-0001-01 as machine-specific information, a function number: J834 as request service information, and one hundred times indicating the number of additional uses as request condition information.

The determinator 110 determines whether a request from the industrial machine 4 can be met or not on the basis of the request information accepted by the request acceptor 100 from the industrial machine 4 and the service information stored in the service information storage 150. After receiving the request information of the industrial machine 4 from the request acceptor 100, the determinator 110 reads service information corresponding to machine-specific information included in the request information, from the service information storage 150. The determinator 110 then determines whether or not service requested by the request information is available and whether or not conditions included in the request condition information can be met. The result of determination by the determinator 110 is outputted to the service information provider 120 and the accounter 130. Moreover, the service information stored in the service information storage 150 is updated on the basis of the result of determination by the determinator 110.

The service information provider 120 provides the result of determination by the determinator 110 to the industrial machine 4. The provided result of determination is handled as information about the permission or the prohibition of use of predetermined service at the industrial machine 4. The provided result of determination from the service information provider 120 includes at least information about the availability of the requested service and the conditions of provision. The conditions of provision may include, for example, information about a remaining use period, the remaining number of uses, or other restrictions on use.

FIG. 4 shows examples of service information stored in the service information storage 150. The service information is for managing the machine-specific information, each piece of which is associated with at least information on the provision of service. The information about the provision of service in the service information includes information indicating a form of provision, a state of provision, and a current use condition of each service. According to the examples in FIG. 4, a service for providing a three-dimensional error correction function with a function number: S666 is provided to determine a use period, as one instance. For the industrial machine 4 with a machine ID: 01-0001-01, a three-dimensional error correction function with a service number: S666 has been purchased. Thus, the user of this machine can permanently use the three-dimensional error correction function at that point. For the same industrial machine 4, a smooth tolerance control function with a function number: R696 is provided to determine a use period or the number of uses. Furthermore, it is understood that the user of this machine does not use the smooth tolerance function at that point. The table in FIG. 4 only shows information on service periods, but the service information may include conditions for the number of uses (e.g., the remaining number of uses), information on restrictions on use (e.g., available only in Japan, available only at night, or available of only function A among all functions), and information about accounting (e.g., a unit price and the total amount of charge).

FIG. 5 shows examples of a result of determination by the determinator 110. When the request acceptor 100 accepts the first request in FIG. 3 while the service information in FIG. 4 is stored in the service information storage 150, the determinator 110 reads the service information of the function number: S666 for the industrial machine 4 with the machine ID: 01-0001-01 from the service information storage 150. Since it is found that the function has been already purchased, as indicated by the first determination result in FIG. 5, it is determined that a request for an additional use period is not to be accepted. In response to acceptance of the second request in FIG. 3, the determinator 110 extends the remaining service period of a tool center point control function with a function number: S677 by 30 days to update the service period to 40 days (the second determination result of FIG. 5). In response to acceptance of the third request in FIG. 3, the determinator 110 adds 100 times to the remaining number of uses of the unprovided smooth tolerance control function with the function number: R696 (the third determination result of FIG. 5). In response to acceptance of the fourth request in FIG. 3, the determinator 110 determines that a balance-cut function with a function number: J834 is not to be provided for the machine (the fourth determination result of FIG. 5).

The accounter 130 performs accounting for provided service on the basis of the result of determination by the determinator 110. In the service information stored in the service information storage 150, information about accounting corresponding to a form of service provision is preset for each service.

FIG. 6 shows an example of accounting information when the form of provision is a use period. In the example in FIG. 6, for the tool center point control function with the function number: S667 when the form of provision is a use period, a daily unit price is set at 100 Japanese yen (JPY) and a yearly unit price is set at 30,000 JPY. Referring to the information, for example, the accounter 130 performs accounting to charge 100 JPY×30=3,000 JPY to the user if the use period of the tool center point control function is extended by 30 days. FIG. 7 shows a display example of an accounting result transmitted to the industrial machine 4.

FIG. 8 shows an example of accounting information when the form of provision is the number of uses. In the example in FIG. 8, for the smooth tolerance control function with the function number: R696 when the form of provision is the number of uses, a unit price for each use is set at 200 JPY and a unit price for 200 uses is set at 35,000 JPY. Referring to the information, for example, the accounter 130 performs accounting to charge 35,000 JPY×1 (200 uses)+200 JPY× 100 (remaining 100 uses)=55,000 JPY to the user if the number of uses of the smooth tolerance control function is increased by 300 for each request.

The accounting may be performed in consideration of other conditions of use. For example, a discount may be offered with a geographical use location limited to a predetermined range, or a discount may be offered with a limited time period of use. The accounting information is preferably preset in the service information.

The communicator 180 manages exchange of information between the service providing device 2 and the industrial machines 4 via the network 5. After receiving the request information from one of the industrial machines 4, the communicator 180 outputs the received request information to the request acceptor 100. When the result of determination of the request information is outputted from the service information provider 120, the outputted determination result is transmitted to the industrial machine 4. Furthermore, the result of accounting by the accounter 130 is transmitted to the industrial machine 4. In addition to the transmission to the industrial machine 4, the information may be transmitted to the user of the industrial machine 4 or the manufacturer of the industrial machine 4 via other communication means such as an email.

The service providing device 2 configured thus according to the present embodiment allows the use of predetermined service at the industrial machine 4 on the basis of the request information transmitted from the industrial machine 4 with any timing. The request information can include a use period, the number of uses, and information about other restrictions on use, enabling accounting according to the request condition information. Thus, among services available at individual industrial machines, minimum service required by the user of the industrial machine 4 can be effectively used when necessary. Moreover, by using minimum required service only when necessary, the cost of service is reduced. This lessens the economic burden of the user of the industrial machine 4, so that lower manufacturing cost is also expected.

As an alternative embodiment of the service providing device 2 according to the present embodiment, the service providing device 2 may output a warning to the user of the industrial machine 4 depending upon the use condition of service. For example, for service provided in the form of a use period, a warning threshold value for a use period is managed as shown in FIG. 9. In the presence of service with a remaining service period equal to or less than the warning threshold value, the service information provider 120 may transmit a warning message for notifying the user of the industrial machine 4 that the remaining use period is equal to or less than the threshold value. Also when the form of provision is the number of uses, a similar warning message can be transmitted by managing a warning threshold value with respect to the remaining number of times of provision. Thus, the provided service can be continuously used without failing to update the use of service.

Figure 10:
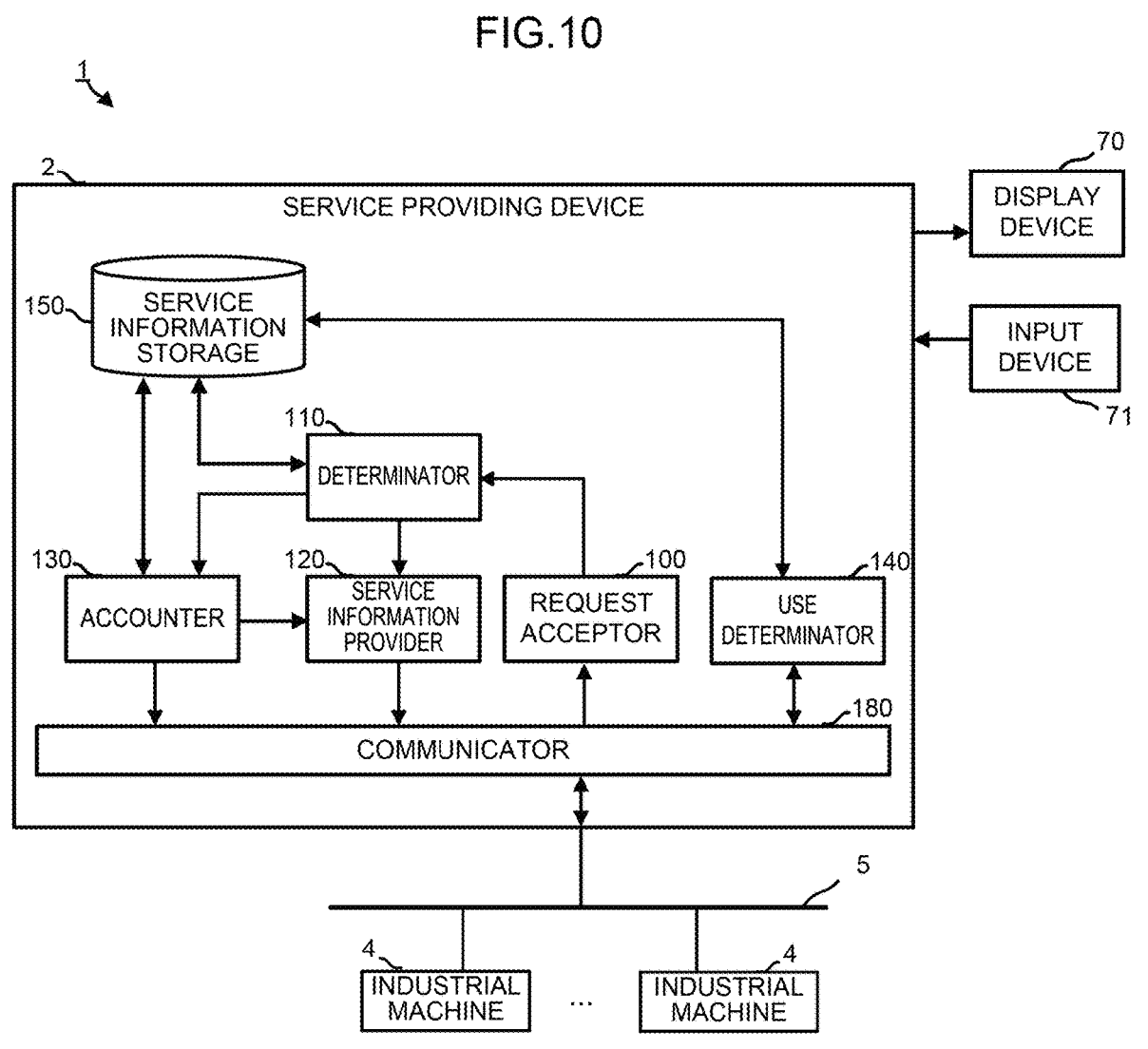

FIG. 10 depicts a schematic block diagram illustrating the functions of a service providing device 2 according to a second embodiment of the present invention. When service is used, an industrial machine 4 according to the present embodiment notifies the service providing device 2 of the use of the service. Moreover, as a response to the notification, the industrial machine 4 is configured to use the corresponding function in response to receipt of information on predetermined permission to use the function from the service providing device 2. The respective functions of the service providing device 2 according to the present embodiment are actualized by executing the system program by a CPU 11 provided for the service providing device 2 illustrated in FIG. 1 and controlling the operations of the respective units of the service providing device 2.

The service providing device 2 includes a use determinator 140 in addition to a request acceptor 100, a determinator 110, a service information provider 120, an accounter 130, and a communicator 180. Moreover, for a RAM 13 and a nonvolatile memory 14 in the service providing device 2, a service information storage 150 is prepared as a storage area of service information which is information on service provided for the industrial machines 4.

The request acceptor 100, the determinator 110, the service information provider 120, the accounter 130, and the communicator 180 have functions similar to those in the service providing device 2 according to the first embodiment.

Figure 11:
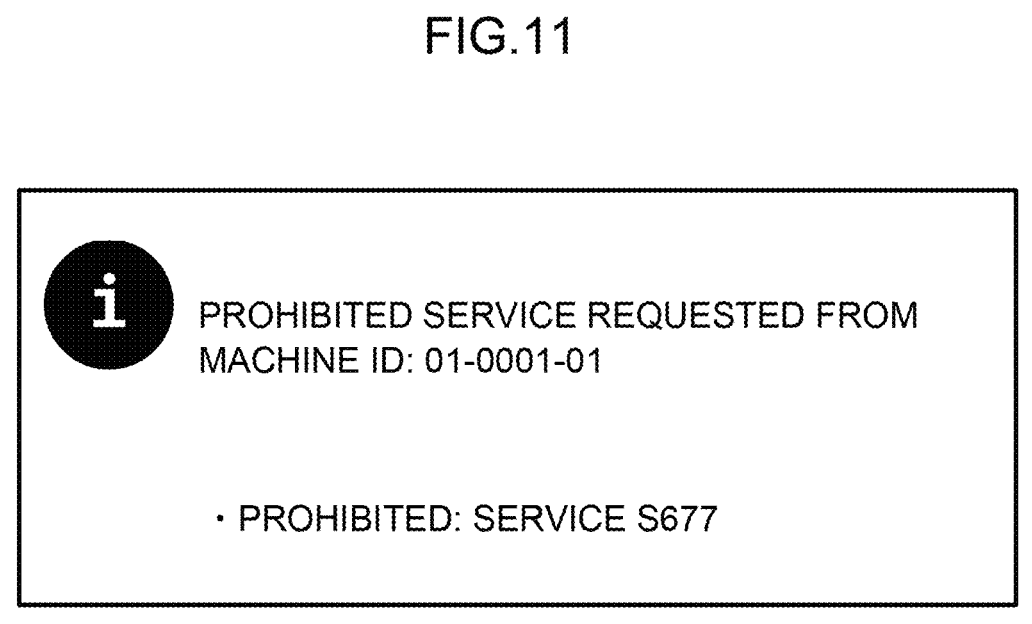

The use determinator 140 determines the availability of service on the basis of service use start information transmitted from the industrial machine 4 and transmits the result of determination to the industrial machine 4. The service use start information transmitted from the industrial machine 4 includes machine-specific information, used service information that can uniquely identify service to be used, and use condition information about the use conditions of the service. The use service information is for enabling service to be used uniquely identified and is similar to the request service information according to the first embodiment. The use condition information includes the use conditions of service to be used (the number of uses, the geographical position of the industrial machine 4 detected by a GPS installed in the industrial machine 4, the use time of service, and functions to be used). The use determinator 140 reads service information corresponding to function-specific information and use service information that are included in the received service use start information, from the service information storage 150. Furthermore, the use determinator 140 determines whether or not the service is available at that point with reference to information including a state of provision, a remaining service period, and the remaining number of times of provision. Moreover, the use determinator 140 compares information about restrictions on use (e.g., available only in Japan, available only at night, or unuse of function A among all functions) in the service information with use condition information included in the service use start information. The use determinator 140 then determines whether or not use conditions satisfy information about use declaration. If it is determined that the service is available as a result of the determination, the use determinator 140 transmits the determination to the industrial machine 4. The industrial machine 4 uses the service on the basis of the determination result. If it is determined that the service is not available, the use determinator 140 transmits the determination to the industrial machine 4. The industrial machine 4 is prohibited from using the service on the basis of the determination result. FIG. 11 shows an example of a warning display on the display device or the like of the industrial machine 4 when the use of service is prohibited. The service use start information does not always need to include use service information. In this case, the service providing device 2 only needs to make a response to the industrial machine 4 about determination whether services provided for the industrial machines corresponding to the machine-specific information and some of the services are available or not under use conditions indicated by the use condition information.

The embodiments of the present invention were described above. The present invention is not limited to the embodiments and can be implemented in various embodiments by proper modifications.

Figure 12:
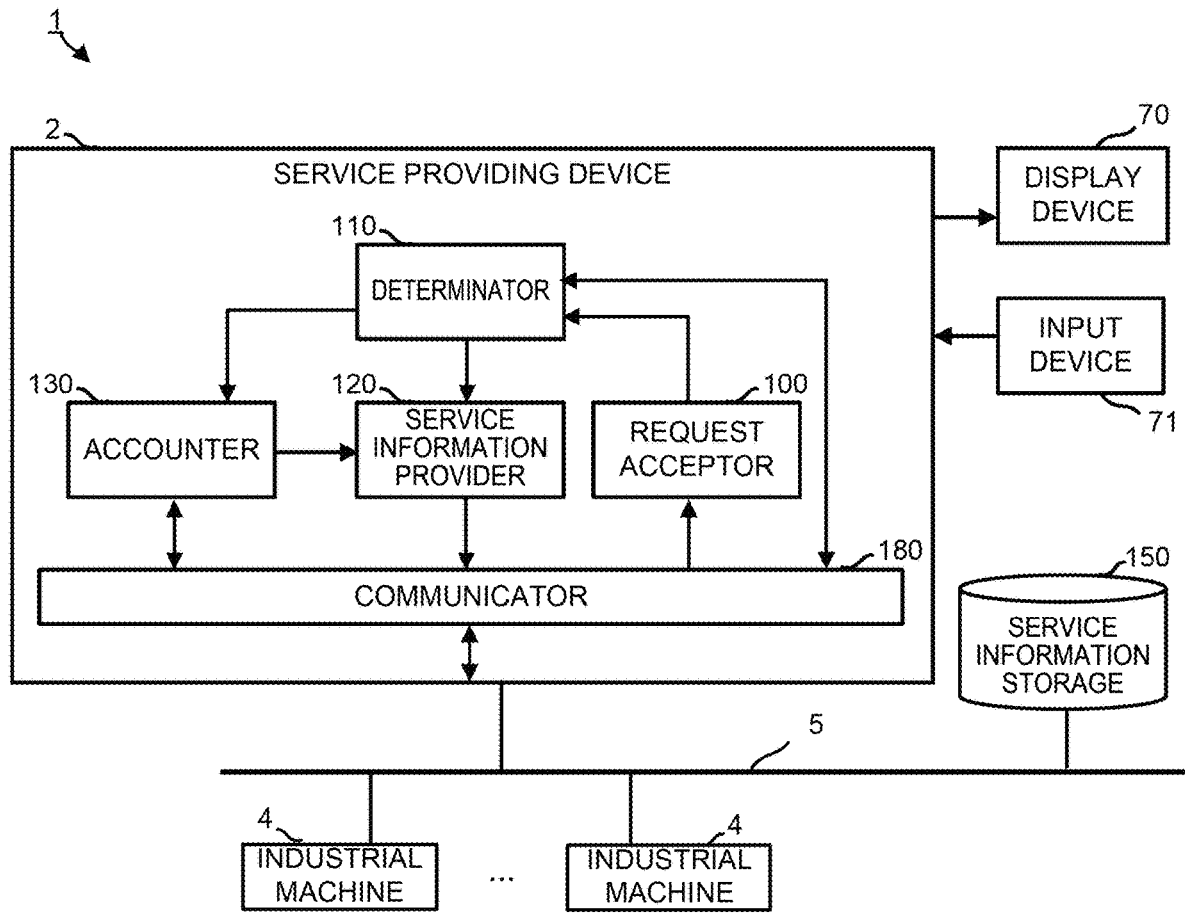
FIG. 12 is a block diagram illustrating schematic functions of a service providing device according to another embodiment.

For example, in the service providing system 1 according to the embodiments, the service information storage 150 is provided in the service providing device 2. However, as illustrated in FIG. 12, the service information storage 150 may be provided on a computer different from the service providing device 2.

The service providing system 1 according to the above-mentioned embodiments is configured such that the service providing device 2 and the industrial machines are connected via the network. However, the service providing device 2 may be configured on a controller for controlling the industrial machines 4. In this configuration, when service is used at the industrial machine 4, request information is outputted to a functional group corresponding to the service providing device 2 configured on the controller. Thereafter, the result of determination by the determinator 110 is outputted as a response to the request information. The service providing device 2 configured on the controller allows the industrial machines 4 separated from the network to use the functions of the invention of the present application.

DESCRIPTION OF THE REFERENCE
NUMERALS

1 Service providing system
2 Service providing device

4 Industrial machine
11 CPU
12 ROM
13 RAM
14 Nonvolatile memory
15, 18, 19, 20 Interface
22 Bus
70 Display device
71 Input device
72 External apparatus
100 Request acceptor
110 Determinator
120 Service information provider
130 Accounter
140 Use determinator
150 Service information storage
180 Communicator

The invention claimed is:

1. A service providing device for an industrial machine, the service providing device being for providing service available at the industrial machine under predetermined conditions, the service providing device comprising a processor configured to:

accept request information including at least machine-specific information for uniquely identifying the industrial machine, request service information for specifying service to be used at the industrial machine, and request condition information including use conditions of the service;

determine availability of service requested by the request information and provision conditions, based on the request information and service information that at least information on provision of service of the industrial machine is associated with the machine-specific information;

accept, from the industrial machine, service use start information including at least machine-specific information for uniquely identifying the industrial machine and use condition information including use conditions of service at the industrial machine, and determine availability of the service at the industrial machine based on the service information and the service use start information; and provide a result of the determination of the availability of service and the provision conditions to the industrial machine, wherein the availability of service and the provision conditions are determined by specifying the requested service from a retrieval of the service information from a service number included in the request information and then comparing at least one of a form of provision, a state of provision or a current use condition of the specified service included in the service information relating to the specified service with an additional request corresponding to the request condition information included in the request information, and the use condition information includes at least one of a number of uses of the specified service, a geographical position of the industrial machine, use time of the service, or a function to be used.

2. The service providing device according to claim 1, wherein the service information includes a unit price for each period or each use of the service, the request condition information includes a use period or the number of uses of the service, and the processor is further configured to perform accounting for the service based on the service information and the request condition information.

3. The service providing device according to claim 1, wherein the service information includes at least one of a form of provision of the service, a current state of provision of the service, a period that the service can be provided, and a remaining period of provision of the service.

4. The service providing device according to claim 1, wherein the processor is further configured to provide a notification about a warning when a remaining period of provision of the service is equal to or less than a predetermined period or a remaining number of times of provision of the service is equal to or less than a predetermined number of times.

5. The service providing device according to claim 1, wherein the service available at the industrial machine is at least a function actualized by performing drive control on a machine tool by a numerical control device or a function actualized by performing drive control on a robot by a robot controller.

6. A service providing system for an industrial machine, the service providing system being for providing service available at the industrial machine under predetermined conditions based on a request, wherein the service providing device according to claim 1 manages at least one industrial machine for performing the service, and the industrial machine is configured to:

output the request information to the service providing device, and provide the service based on a result of determination by the determinator of the service providing device in response to the request information.

7. The service providing system according to claim 6, wherein the service providing device and the industrial machine are connected to each other via a network, and the industrial machine communicates with the service providing device via the network.

8. The service providing system according to claim 7, wherein the service providing device is configured on a controller for controlling the industrial machine.

9. A computer-readable non-transitory recording medium wherein a program for operating a computer as a service providing device for an industrial machine is recorded, the service providing device being for providing service available at the industrial machine under predetermined conditions, the program causing the computer to operate as:

a request acceptor for accepting request information including at least machine-specific information for uniquely identifying the industrial machine, request service information for specifying service to be used at the industrial machine, and request condition information including use conditions of the service;

a determinator for determining availability of service requested by the request information and provision conditions based on the request information and service information that at least information on provision of service of the industrial machine is associated with the machine-specific information;

a use determinator for accepting, from the industrial machine, service use start information including at least machine-specific information for uniquely identifying the industrial machine and use condition information including use conditions of service at the industrial machine, and determine availability of the service at the industrial machine based on the service information and the service use start information; and a service information provider for providing a result of determination by the determinator and the use determinator to the industrial machine, wherein the availability of service and the provision conditions are determined by specifying the requested service from a retrieval of the service information from a service number included in the request information and then comparing at least one of a form of provision, a state of provision or a current use condition of the specified service included in the service information relating to the specified service with an additional request corresponding to the request condition information included in the request information, and the use condition information includes at least one of a number of uses of the specified service, a geographical position of the industrial machine, use time of the service, or a function to be used.

\* \* \* \* \*